(12) United States Patent
Michel

(10) Patent No.: US 8,342,314 B2
(45) Date of Patent: Jan. 1, 2013

(54) OBJECT TRANSFER DEVICE AND CORRESPONDING GRIPPER

(75) Inventor: Jocelyn Michel, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 176 days.

(21) Appl. No.: 13/025,914

(22) Filed: Feb. 11, 2011

(65) Prior Publication Data

US 2011/0198198 A1    Aug. 18, 2011

(30) Foreign Application Priority Data

Feb. 15, 2010  (FR) ...................................... 10 51048

(51) Int. Cl.
*B65G 47/86* (2006.01)
(52) U.S. Cl. ............... 198/468.5; 198/472.1; 198/803.6; 294/110.1
(58) Field of Classification Search ............ 198/377.03, 198/377.07, 377.09, 468.2, 468.5, 470.1, 198/472.1, 867.02, 867.04, 803.3, 803.6; 294/198, 90, 106, 110.1
See application file for complete search history.

(56) References Cited

U.S. PATENT DOCUMENTS

| 4,681,213 | A | * | 7/1987 | Winiasz | 198/803.9 |
| 4,943,099 | A | * | 7/1990 | Gabriel | 294/82.32 |
| 4,968,081 | A | * | 11/1990 | Beight et al. | 294/104 |
| 6,626,476 | B1 | | 9/2003 | Govzman et al. | |
| 7,784,603 | B2 | | 8/2010 | Burgmeier | |
| 8,128,142 | B2 | * | 3/2012 | Glotzl | 294/116 |
| 2008/0272609 | A1 | * | 11/2008 | Knieling et al. | 294/90 |

FOREIGN PATENT DOCUMENTS

DE    102005041929 A1    3/2007
JP    2-190229 A    7/1990

* cited by examiner

*Primary Examiner* — Mark A Deuble
(74) *Attorney, Agent, or Firm* — Sughrue Mion, PLLC

(57) ABSTRACT

Object transfer device comprising a frame (3,20,63,58), at least one gripper (6,22,22a,62,57a,57b) having a gripper body (7,25,45) and means of guiding the gripper body with respect to the frame; the gripper being equipped with one or more jaws (8,28a,28b,46) mobile with respect to the gripper body (7,25,45). The gripper comprises a magnetic element (12,32,44,52,56) capable, when it is subjected to a magnetic field greater than an efficiency threshold, of exerting a force on at least one mobile jaw. The frame comprises a control device (24,49,50) of the gripper capable of creating a magnetic field greater than the efficiency threshold in at least one zone (14,15) of the frame dedicated to the operation of the gripper. Said gripper body guide means is designed so that the magnetic element of the gripper is driven in translation along a movement path (13,33) passing through the operation zone (14,15) of the gripper defined by the control device (24,49, 50).

17 Claims, 6 Drawing Sheets

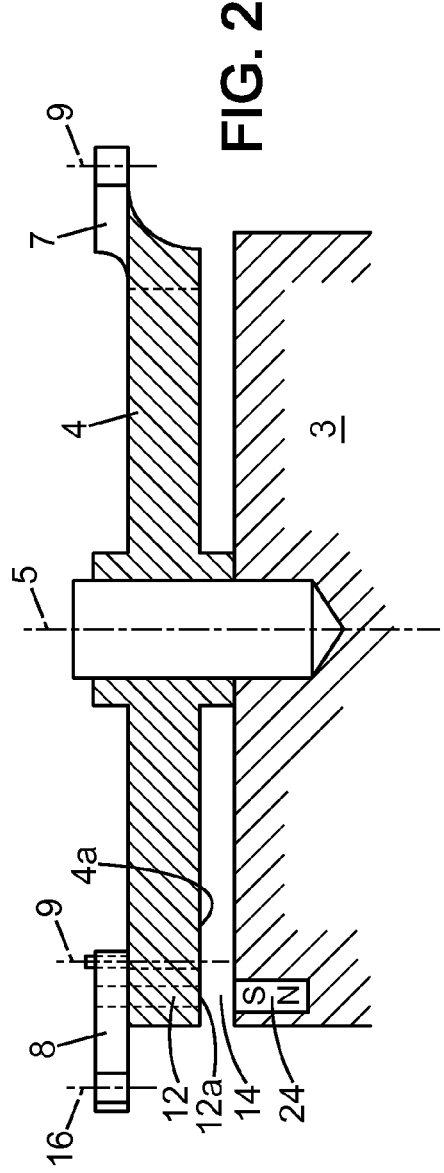
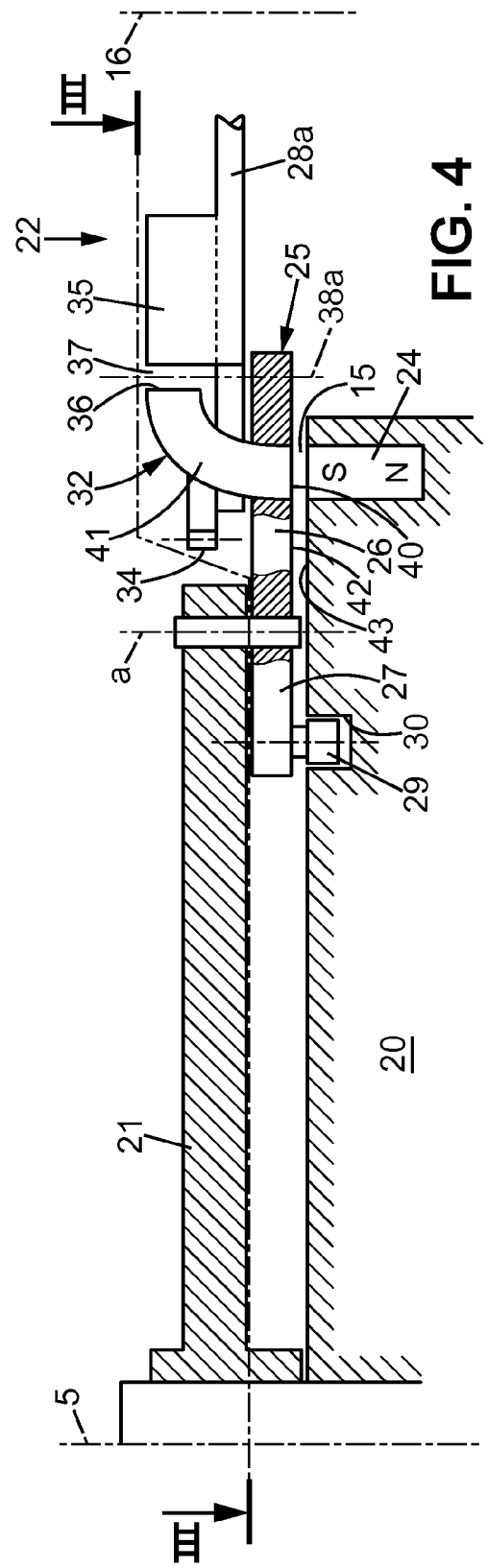

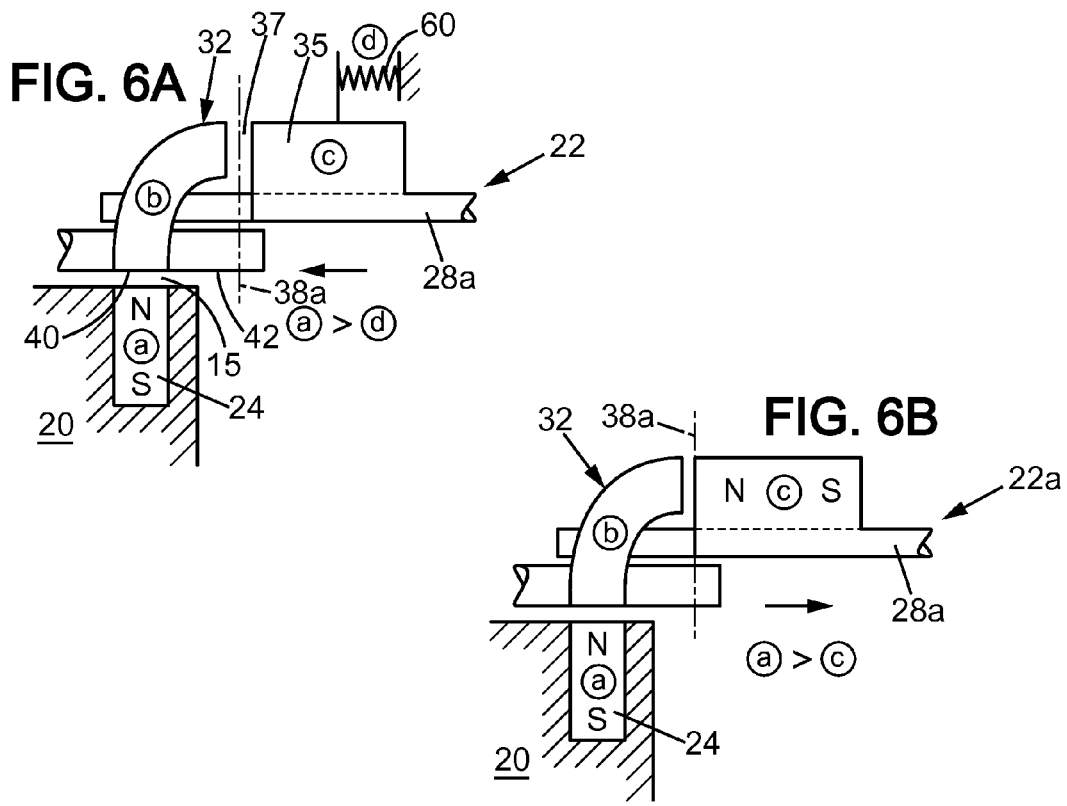
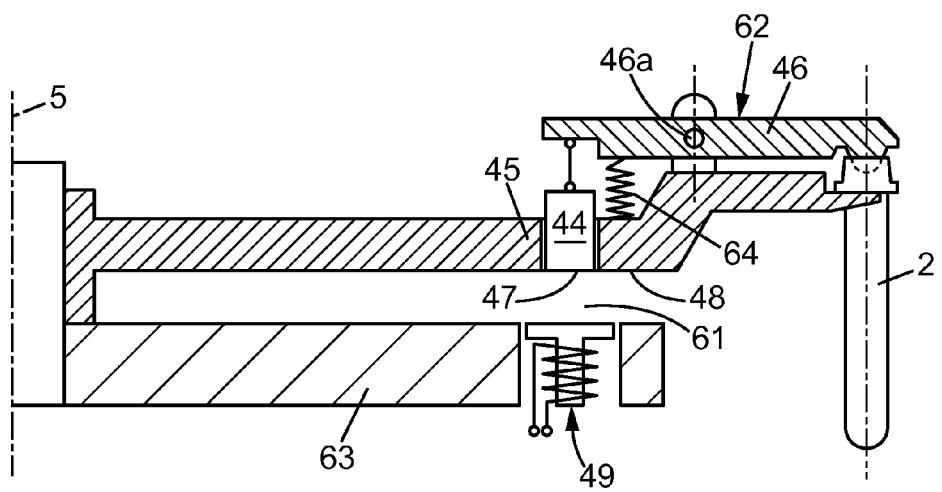

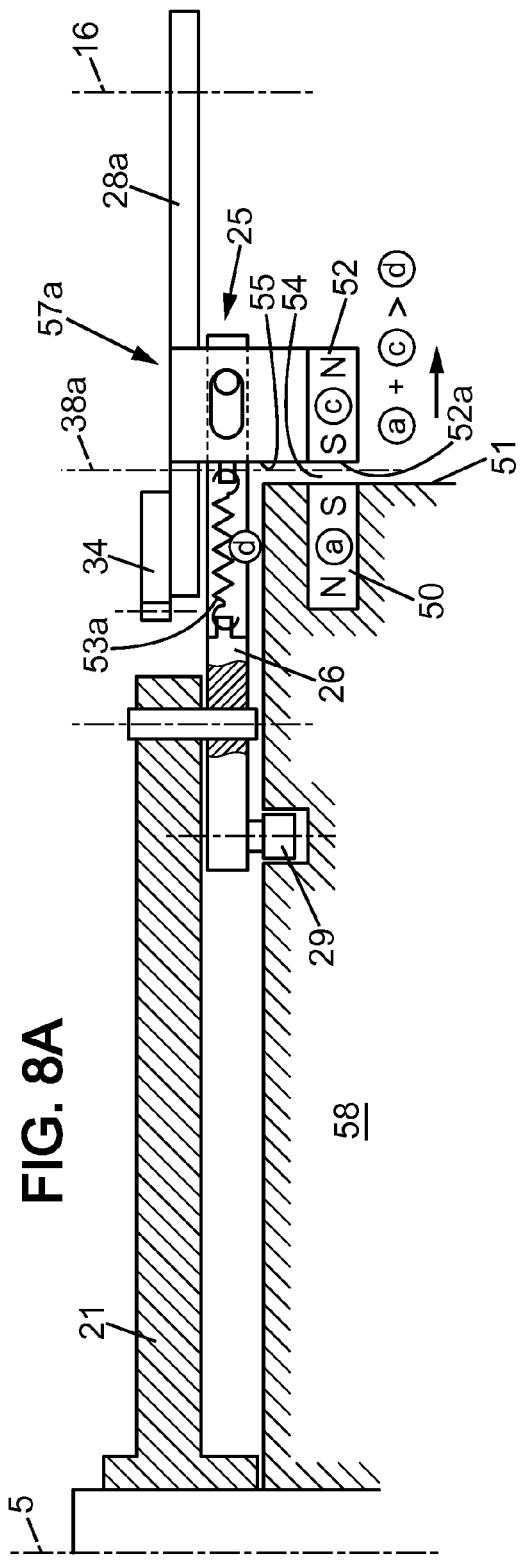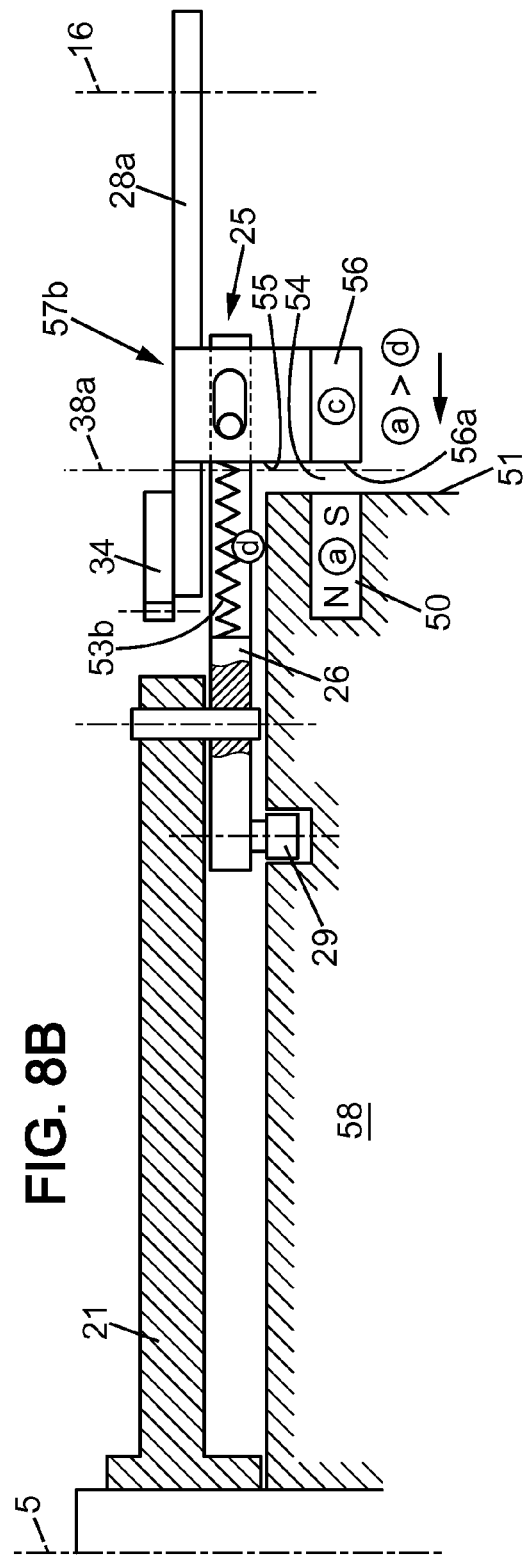

OBJECT TRANSFER DEVICE AND CORRESPONDING GRIPPER

The invention relates to the field of object transfer devices having a gripper allowing an object to be grasped in one location and released in another location. These transfer devices can be of the transfer wheel type, cooperating for example with carousels.

The invention also relates to the appropriate gripper for object transfer devices.

Patent application FR 2,479,077 describes an industrial plant for the production of bottles, equipped with a device for the transfer of preforms between an oven for pre-heating the preforms and a blow-moulding machine for bottles.

The transfer device described comprises a series of arms that are equipped with grippers and that are driven in rotation. The opening and closing of the grippers is controlled by a system of mechanical cams. During the rotation, a roller attached to a mobile jaw of the gripper slides in a fixed groove.

One of the advantages of operating grippers via mechanical cams is that very high speeds are possible with high reproducibility. A drawback of this type of grippers and transfer device is that setting up the guide groove of the cam is complex and that the cams eventually become worn, resulting in deviation from the point of operation of the transfer device.

A further drawback of this type of operation by roller sliding in a groove is that the relative movement of the roller with respect to the gripper body forces the gripper jaw to open or close. In other words, the preform to be transferred is gripped in a positive manner. In the event of an incident, the gripped preform is jammed and cannot easily be extracted from the gripper in the closed position. This can cause wastage, or risk leading to the stoppage of the entire industrial plant, resulting in high maintenance costs. It would be much less costly for the object transferred in a faulty manner to be cleanly removed and for the industrial plant to continue its course without further processing of the removed object.

Moreover, application WO2006/099610 describes a gripper for a container transfer system. The gripper comprises two jaws that are mobile in rotation, each comprising a permanent magnet at a distance from the axis of rotation of the jaw. The permanent magnets are arranged so as to repel each other and to return the gripper to the closed position. The opening of the gripper is controlled by the approach of the object itself. While approaching the gripper, the object slides along an inclined plane at the end of each of the jaws and pushes the jaws outwards. The gripper opens in this way while the repelling magnets come closer to each other. In other words, the permanent magnets operate like a return spring mounted under compression. A drawback of this type of gripper is that the insertion of the object leads to friction on the jaw. This can cause wear and/or a loss of adjustment of the transfer gripper.

The invention proposes an object transfer device and a gripper suitable for a transfer device that overcome at least one of the above-mentioned drawbacks.

A purpose of the invention is to propose a gripper and a transfer device, of which the operation of the gripper is reproducible, easier to set up, reducing the deviation in operation, and which does not cause the gripper to become jammed in the event of an incident.

According to one aspect, the invention relates to an object transfer device comprising a frame, at least one gripper having a gripper body and a means of guiding the gripper body with respect to the frame; the gripper being equipped with one or more jaws that are mobile with respect to the gripper body. The gripper comprises a magnetic element capable, when subjected to a magnetic field greater than an efficiency threshold, of exerting a force on at least one mobile jaw. The frame comprises a gripper control device capable of creating a magnetic field greater than the efficiency threshold in at least one area of the frame corresponding to the operation of the gripper. Said means of guiding the gripper body is designed so that the magnetic element of the gripper is driven in translation along a movement path passing through the operation zone of the gripper defined by the control device.

Using the guide means and the operation zone on the frame, the force exerted by the magnetic element will be able to open or close the gripper according to the position of the gripper and not permanently like the magnetic return means described in application WO2006/089610. Thus, the operation zone and the magnetic element behave as a magnetic cam system allowing for operation that is as reproducible as mechanical cams, without however causing the gripper to jam. The fact of acting on the jaw by interaction between a magnetic field created on the frame and the magnetic element of the gripper allows for operation without contact either between the frame and the gripper or between the gripper and the object. This reduces the deviation in operation. Moreover, the position of the operation zone can more easily be adjusted during the setting-up of the transfer device than the position of a groove in a frame.

Advantageously, the gripper comprises switching means that can be operated in order to pass from a first configuration to a second configuration of the gripper, one of the configurations corresponding to the opening of the gripper and the other configuration corresponding to a clamping of the gripper onto the object to be transferred, the gripper comprising moreover permanent means of returning from the second configuration to the first configuration; the switching means comprising said magnetic element and being capable of overcoming the action of the return means only when the magnetic element is subjected to a magnetic field greater than the efficiency threshold.

According to a further embodiment, the object transfer device is of the transfer wheel type. The gripper guide means comprises a support onto which the gripper is fixed, the support being mobile in rotation with respect to a main axis of the frame.

Advantageously, the jaw or jaws of the gripper are mounted at the end of an arm, said arm being telescopic and/or hinged around a point of attachment (a) to the support situated at a distance from the main axis of the frame.

According to a variant, the magnetic element has a magnetic field detection surface extending in a plane perpendicular to the main axis of the frame.

According to another variant, the magnetic element has a magnetic field detection surface extending in a plane parallel to the main axis of the frame and to the movement path of the magnetic element.

Advantageously, the control device is magnetic field generator comprising a permanent magnet and/or an electromagnet.

According to a further aspect, the invention also relates to a gripper for an object transfer device. The gripper extends within a volume delimited globally by an outer surface of the gripper, the gripper comprising a gripper body, at least one jaw mobile with respect to the gripper body and at least one first magnetic element. The first magnetic element has a magnetic field detection surface that is substantially exposed through the outer surface of the gripper so as to be capable of forming a magnetic interface with a magnetic control device external to the gripper.

By outer surface of the gripper is meant a surface delimiting the volume in which the gripper is situated, a surface that surrounds the gripper.

Advantageously, the magnetic element detection surface is substantially flush with the outer surface of the gripper.

Advantageously, the magnetic element detection surface is exposed through a portion of the outer surface in front of which a transfer path of a frame is able to pass, the control device being arranged along the transfer path. In other words, the portion of the outer surface where the detection surface is exposed is open on at least two opposite sides.

The arrangement of the magnetic element makes it possible to control the gripper without contact with the device external to the gripper. There is no friction with the object to be transferred or with a frame of the transfer device. Moreover, the magnetic interface with a control device prevents the gripper from jamming in the event of an incident.

According to an embodiment, the gripper comprises switching means that can be operated from a first configuration of the gripper to a second configuration of the gripper, one of the configurations corresponding to the opening of the gripper and the other configuration corresponding to a clamping of the gripper onto the object to transfer, the gripper comprising moreover permanent return means capable of moving the mobile jaw to the first configuration; the operable switching means comprising the first magnetic element that is interdependent with the gripper body and a second magnetic element that is interdependent with the mobile jaw; the gripper having an air gap between the first and the second magnetic element distant from the detection surface of the first magnetic element, the air gap being dimensioned so that, when the detection surface is immersed in a magnetic field greater than an efficiency threshold, a force capable of overcoming the return means is applied to the mobile jaw.

Advantageously, the mobile jaw is mounted in rotation around a hinge axis. The air gap extends at a distance from the axis, in a plane parallel to the hinge axis.

Advantageously, the first magnetic element has two end portions connected by an elbow shape, the end of one of the portions being the magnetic field detection surface, the end of the other portion defining the air gap.

Advantageously, the first magnetic element is constituted by soft iron and the second magnetic element is constituted either by soft iron or by a permanent magnet.

Advantageously, the permanent return means comprises at least one permanent magnet.

Advantageously, the gripper comprises a second mobile jaw and a means of synchronizing the movement of the two jaws with respect to the gripper body.

The present invention will be better understood on studying the detailed description of several embodiments given by way of non-limitative examples and illustrated by the attached drawings in which:

FIG. 2 is a partial cross-section along plane II-II in FIG. 1,

FIG. 4 is a partial section along plane IV-IV in

Figure 3:
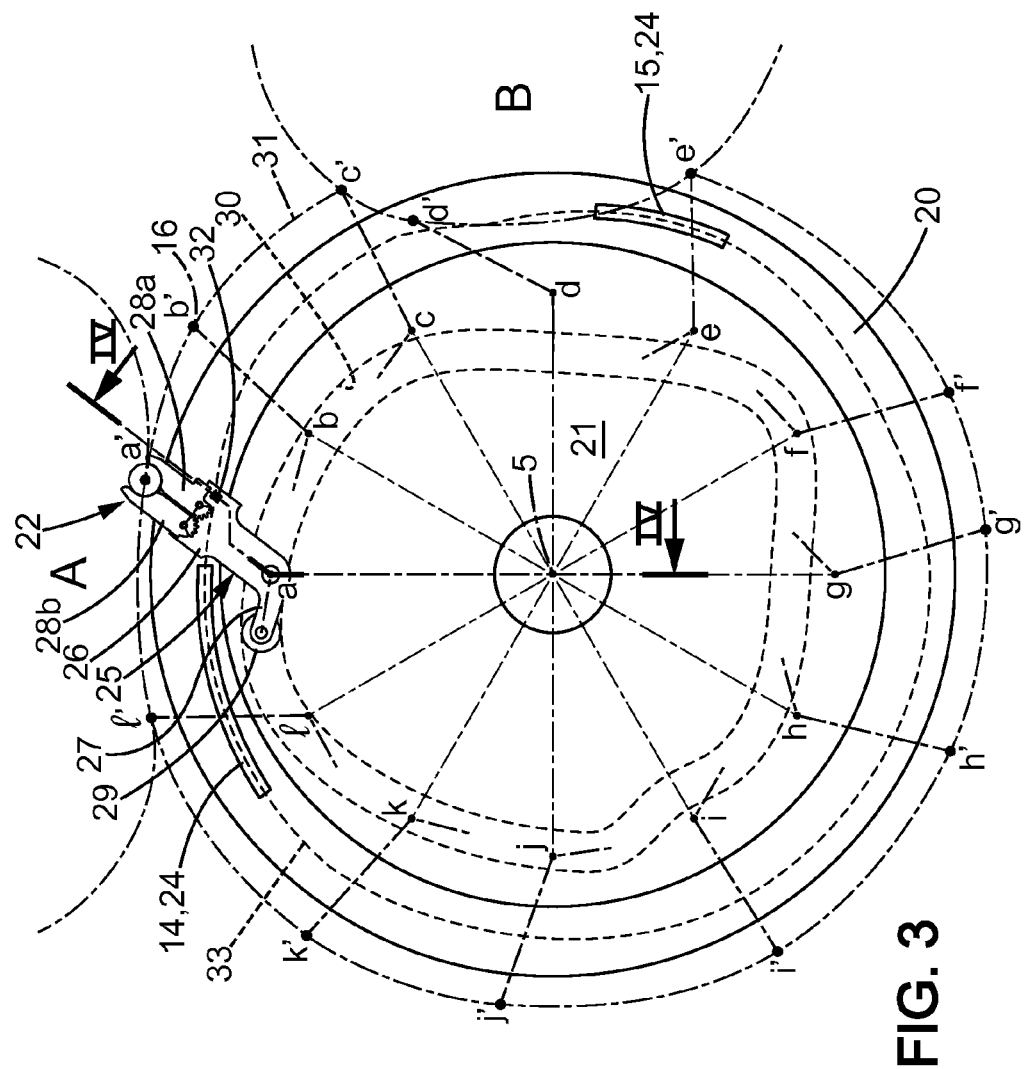
FIG. 3 is a top view of a second embodiment of the transfer device viewed along plane III-III in FIG. 4, a single gripper being shown.
Figure 5A:
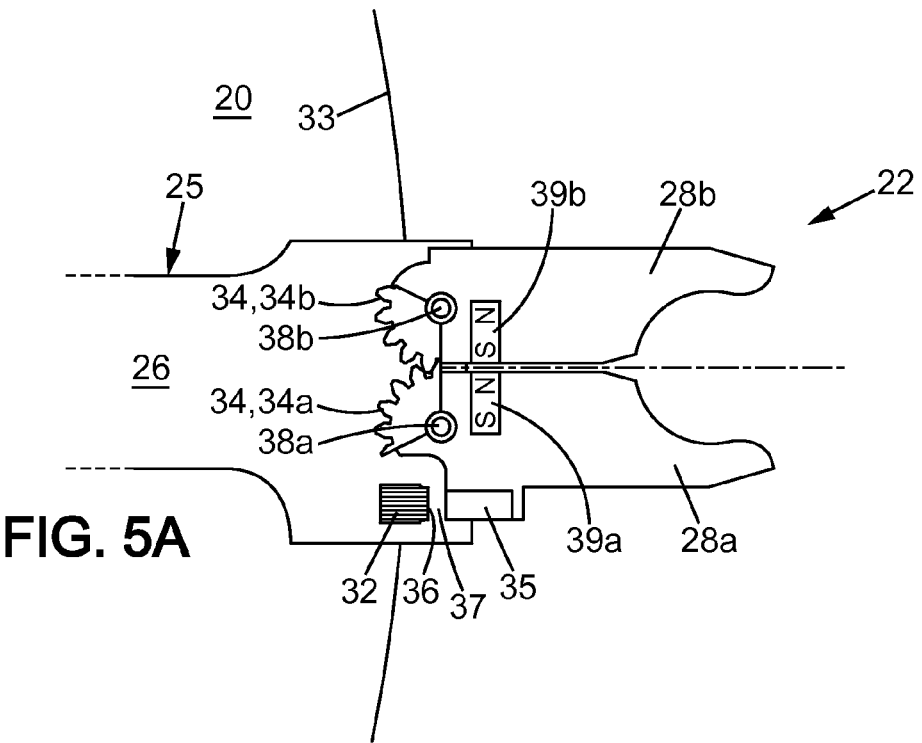
Figure 5B:
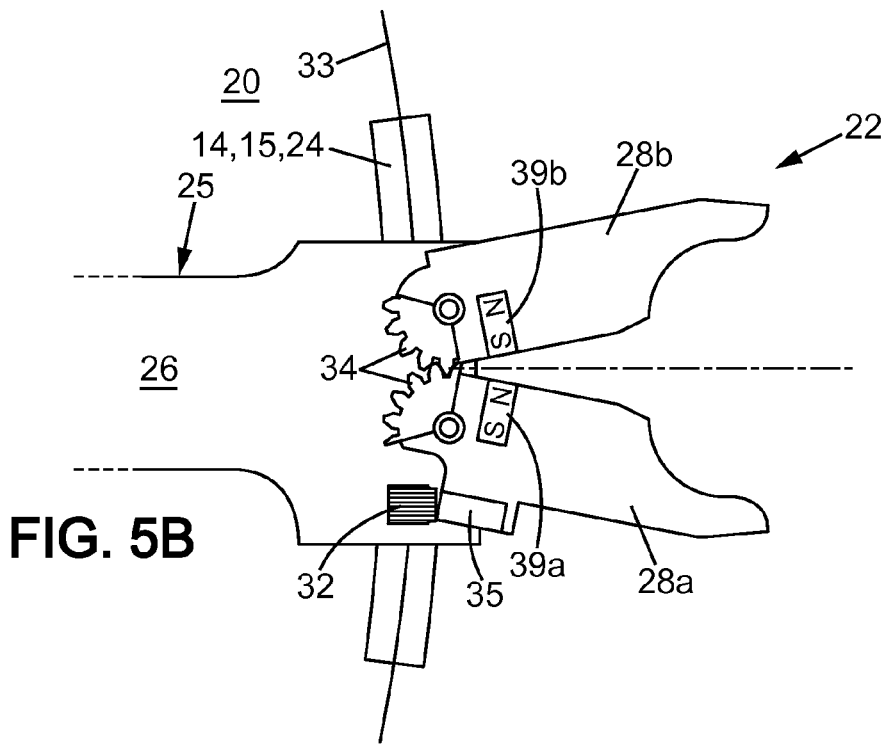

FIG. 3,

FIGS. 5A and 5B are top views respectively in the closed and open position of an embodiment of the gripper, FIGS. 6A and 6B are illustrations along plane IV-IV in FIG. 3 of two variants of the second embodiment, FIG. 7 is an illustration of a third embodiment of the transfer device, and FIGS. 8A to 8B are illustrations of two variants of a fourth embodiment.

Figure 1:
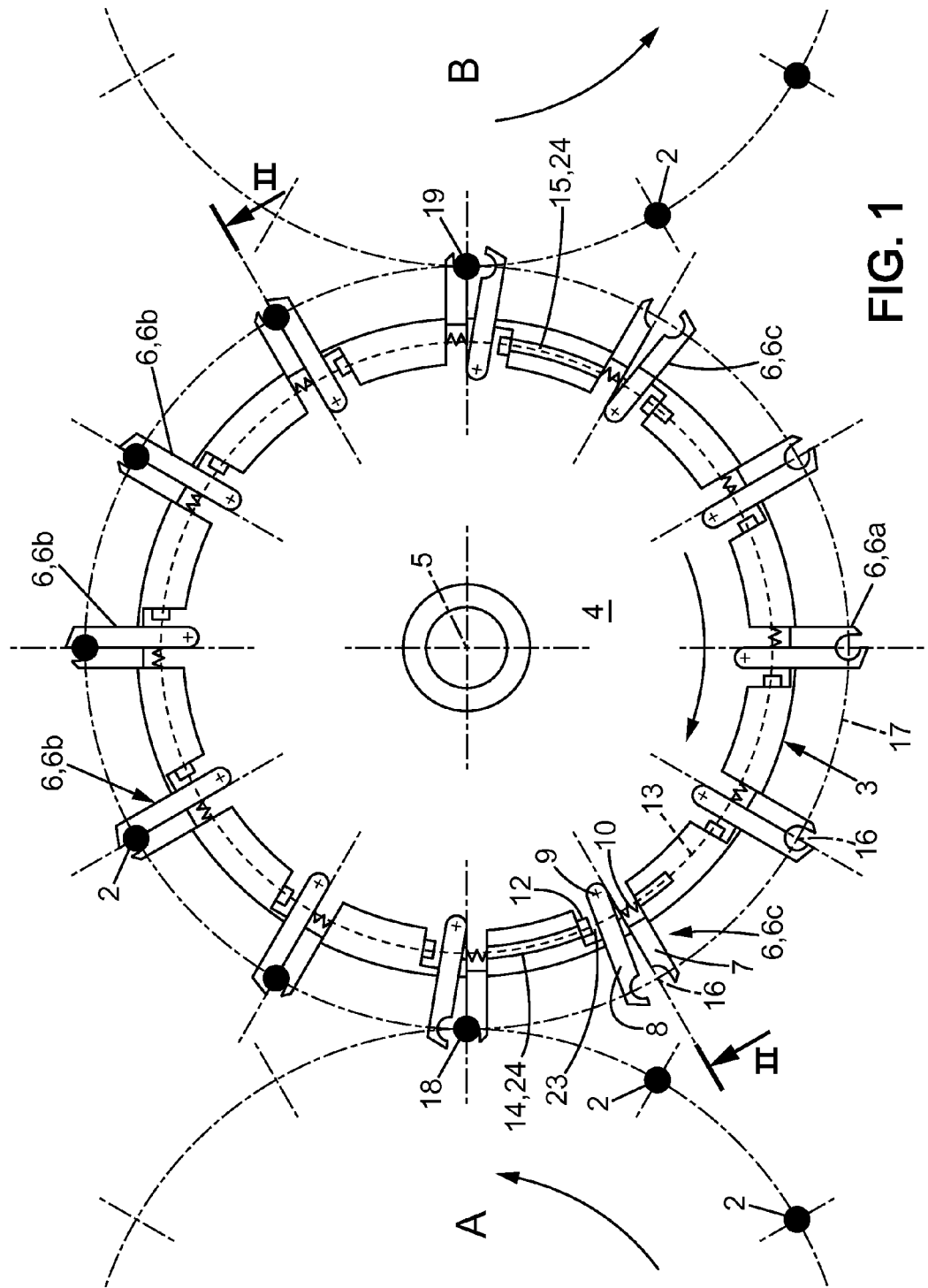
FIG. 1 is a top view of a first embodiment of the transfer device.

As shown in FIGS. 1 and 2, the transfer device makes it possible to transfer an object 2 from an upstream conveyor A to a downstream conveyor B. The transfer device comprises a frame 3, in a fixed location with respect to the upstream and downstream conveyors A, B and a transfer wheel 4 mobile in rotation about a main axis 5 of the frame 3.

The transfer wheel 4 is a support of a plurality of grippers 6 each having a fixed jaw 7 and a mobile jaw 8 around a hinge axis 9.

Each of the grippers 6 includes a return spring 10 permanently pulling the mobile jaw 8 towards the fixed jaw 7 so that when idle the gripper 6, said gripper 6 is in a configuration corresponding either to a closed position 6a of the gripper, or to a position 6b allowing for clamping of the gripper on the object 2 in the process of transfer.

Each of the grippers 6 comprises a magnetic element 12 made of soft iron. During the rotation of the transfer wheel 4, the magnetic element 12 of each of the grippers 6 moves along the same path 13. The path 13 extends along an immobile location with respect to the frame 3.

The frame 3 comprises a first zone 14 and a second zone in which a magnetic field is generated having an intensity greater than an efficiency threshold. When a lower end 12a of the magnetic element 12 (shown in FIG. 2) enters the first zone 14 or the second zone 15, the magnetic field is then conducted by the magnetic element 12 to an air gap 23 (shown in FIG. 1) situated between the magnetic element 12 and the mobile jaw 8. The mobile jaw 8 is also made of soft iron. Thus, the zones 14 and 15 are zones dedicated to the operation of the gripper 6, as on entering said zones, the magnetic element 12 attracts to it the mobile jaw 8. The efficiency threshold of the magnetic field created in the zones 14, 15 is such that the attraction created between the magnetic element 12 and the magnetic material of the mobile jaw 8 is greater than the effort exerted by the return spring 10. Thus the mobile jaw 8 opens when the magnetic element of a gripper 6 enters one of the zones 14 or 15. The corresponding gripper is then in an open position 6c allowing for either the introduction or the removal of the object 2 to be transferred.

Each of the grippers 6 has a grip axis 16 corresponding to the recess intended to receive the object 2 to be transferred. The grip axis 16 can have any orientation whatever with respect to the main axis 5 of the frame. However, a particularly advantageous embodiment of the transfer device makes it possible to transfer preforms for the production of containers from an upstream conveyor A originating from a preheating oven to a downstream conveyor B of a stretch/blowing machine. In such a use of the transfer device, the grip axis 16 of each of the grippers 6 is advantageously parallel to the main axis 5 of the frame.

The grip axes 16 of each of the grippers 6 describe a cylinder 17 during the rotation of the transfer wheel 4. The objects 2 to be transferred, driven by the upstream conveyor A, reach a loading position 18 of the object 2 that is tangential to the transfer cylinder 17. The axis of the object 2 retrieved by the downstream conveyor B is tangential to the cylinder 17 in an unloading position 19 of the object 2.

The first zone 14 of the frame 3 is situated along the path 13 of the magnetic element 12 upstream of the loading position 18. The second zone 15 also extends along the path 13 and is situated downstream of the unloading position 19. Thus, the grippers 6 reaching the first zone open in order to allow the object 2 conveyed by the conveyor A to enter the corresponding gripper 6. As soon as the gripper reaches the loading position 18, its magnetic element 12 leaves the first zone 14 and the mobile jaw 8 of said gripper 6 is no longer subject to a strong enough magnetic field. It is therefore subject to the force exerted by the return spring 10. So, the gripper 6 closes on the object 2 that has just been loaded.

The axis of the loaded object 2 is translated along the cylinder 17 to the unloading position 19 in which the magnetic element 12 of the corresponding gripper 6 enters the second magnetic field zone 15. The mobile jaw 8 is then attracted by the magnetic element 12 subjected to a magnetic field that is greater than the efficiency threshold, so that the mobile jaw 8 opens and makes it possible to unload the conveyed object which can then be loaded by the downstream conveyor B.

As shown in FIG. 2, the end 12*a* of the magnetic element 12 is exposed through the outer surface 4*a* of the portion of the wheel 4 serving as a gripper body. As a variant, the end 12*a* of the magnetic element 12 can project from the surface 4*a*. In any case, the surface 12*a* is exposed through the outside of the gripper in order to constitute a detection surface 12*a* of the magnetic field existing outside the gripper 6. The surface 12*a* could be slightly set back from the lower surface 4*a* of the gripper 6, on the condition however that the reinforcement constituted by the surface 12*a* does not introduce a detrimental attenuation of the magnetic field, in order to transmit a magnetic field with an adequate intensity to the air gap 23.

The frame 3 comprises a control device 24 constituted by a succession of flush-mounted permanent magnets along zones 14 and 15, the polarities of which are described in FIGS. 4, 6 and 8. Alternatively, the control device 24 can be constituted by an insert made of soft iron extending along zones 14 and 15, said insert being magnetically linked to a single magnetic field generator. A submerged magnetic link connects the two zones 14 and 15 so that the magnetic field experienced by the magnetic elements 12 of the grippers circulating along the path 13 is weaker than the efficiency threshold providing that said magnetic element 12 does not enter the gripper operation zones 14 or 15.

The second embodiment shown in FIGS. 3 and 4 comprises a frame 20 and a support 21 equipped with a plurality of grippers 22 that are fixed to the support 21 at a plurality of fixing points shown by letters "a" to "l". The support 21 takes the form of a wheel mounted in rotation about the main axis 5 of the frame 20. Each of these fixing points (a . . . l) is equidistant from the main axis 5 of the frame 20.

Each of the grippers 22 is constituted by a gripper body 25 on the support 21 comprising an arm 26 and a lever extending radially from the fixing point "a" of the gripper body 25. A pair of mobile jaws 28*a*, 28*b* is arranged at the end of the arm 26 opposite the fixing point "a". A roller 29 is mounted in rotation at the end of the lever 27 opposite the fixing point "a". The frame 20 has a groove 30 having substantially the width of the roller 29 and acting as a cam controlling the orientation of the grippers 22 with respect to the support 21. The groove 30 extends along a non-circular closed loop.

Only one gripper 22 has been shown in detail in FIG. 3. For the other grippers mounted on the support 21, only the axes of the arm 26 and the lever 27 have been shown, between them forming a constant lever angle. For each of the grippers, the position of the axis of the mobile jaws 28 intended to receive the object 2 to be transferred is shown by the letters "a'", "b'", . . . "l'" corresponding to the same letters of the fixing points "a'", "b'", . . . "l'". Thus, the axes of the transported objects move along a tubular surface 31 that has a non-circular cross-section. This ensures that the zone of coincidence between the path of the objects conveyed by the upstream A or downstream B conveyors is not limited to a single loading or unloading position.

Each of the grippers 22 has a first magnetic element 32 mounted on the gripper body 25. The first magnetic element 32 travels a path 33 in the shape of a non-circular loop during the rotation of the support 21. The shape of the path 33 is directly defined by the dimensions of the lever 27 and by the shape of the groove 30.

The frame 20 also has a control device 24 constituted in the same manner as for the frame 3 in the first embodiment. The control device 24 also has a first zone 14 and a second zone 15 intended for operating the grippers 22.

As shown in FIG. 4, the first magnetic element 32 has an outer end 40 connected to an inner end 36 by an elbow shape 41. The mobile jaw 28*a* comprises a second magnetic element 35 separated from the inner end 36 of the first magnetic element 32 by an air gap 37.

The gripper body 25 is delimited by an outer surface that comprises in particular a lower surface 42 of the gripper that is facing an upper surface 43 of the frame 20. The lower surface 42 moves horizontally parallel to the upper surface 43 of the frame 20 during the rotation of the support 21. In other words, the upper surface 43 of the frame moves past the lower surface 42. The surface 42 of the gripper body 25 constitutes a reference outer face for the gripper 22.

The outer end 40 of the first magnetic element 32 is substantially exposed through the outer reference face 42 of the gripper body 25. The gripper body 25 is made of a non-magnetic material such as stainless steel, aluminum or a synthetic material. The outer end 40 of the first magnetic element 32 made of soft iron constitutes a detection surface of the magnetic field generated by the control device 24. In other words, the surface 40 constitutes a magnetic interface of the gripper 22 vis-à-vis the control device 24. When the gripper 22 is over the operation zone 14 or 15, the existence of the first magnetic element 32 guiding the magnetic field to the air gap 37 generates a magnetic field strength on the second magnetic element 35, significantly greater than the magnetic field that would have reached this second magnetic element 35 without the presence of the first magnetic element 32. In other words, the existence of the first magnetic element 32, extending from an outer surface of the gripper 22 to an inner mechanism for switching the mobile jaw 28*a*, makes it possible to bring the magnetic field detected outside the gripper 22 to said inner switching mechanism with an intensity greater than the efficiency threshold.

As shown in FIGS. 5A and 5B, each of the mobile jaws 28*a*, 28*b* is mounted in rotation on the arm 26 of the gripper body 25 about a rotation pin 38*a* respectively 38*b*. Each of the mobile jaws 28*a*, 28*b* also has gear teeth 34*a*, 34*b* meshing together and constituting a synchronizing means 34 of the two jaws 28*a*, 28*b* with respect to the gripper body 25. Each of the jaws 28*a*, 28*b* also comprises a return magnet 39*a*, 39*b* situated opposite each other at a distance from the plane comprising the rotation pins 38*a*, 38*b*. The return magnets 39*a*, 39*b* are orientated magnetically so as to attract each other.

In the open configuration shown in FIG. 5B, the first magnetic element 32 is located in an operation zone 14 or 15 defined on the frame 20 and the magnetic field conducted by the first magnetic element 32 into the air gap 37 causes the mobile jaw 28*a* to pivot around its rotation pin 38*a*. The traction generated between the first and second magnetic elements 32, 35 causes a torque greater than that of the return magnets 39*a*, 39*b*.

On the basis of FIGS. 6A and 6B, two variants of the second embodiment will now be described.

In FIG. 6A, the control device 24 is a permanent magnet flush-mounted in the frame 20 denoted by the letter (a). The first magnetic element, denoted by the letter (b) is made of soft iron. The second magnetic element, denoted by the letter (c) is also made of soft iron. The mobile jaw is connected to a return spring 60 fixed to the gripper body 25, operating under tension and denoted by the letter (d). The first magnetic element (b) makes it possible to magnetically link the zone 15 having a magnetic field greater than the efficiency threshold to the air gap 37. The operation of the control device causes the movement of the mobile gripper 28a in the direction of the arrow on the condition that the force generated by the control device (a) is greater than the return force exerted by the return spring (d). This operation condition is shown by (a)>(d) in FIG. 6A.

In the variant shown in FIG. 6B, the return means is produced directly by the first magnetic element (b) and the second magnetic element shown by the letter (c). The second magnetic element (c) is a permanent magnet 35b that permanently attracts the first magnetic element (b) made of soft iron. When the gripper passes in front of the permanent magnet (a) of the control device, the second magnetic element (c) is repelled in the direction of the arrow on the condition that the magnetic intensity generated by the control device (a) is greater than the magnetic intensity exerted by the second magnetic element (c). This operation condition is shown by "(a)>(c)" in FIG. 6B.

The embodiment shown in FIG. 7 comprises a gripper 62 equipped with a single magnetic element 44 made of soft iron that is mobile with respect to a gripper body 45 and integral with a jaw 46 that is mobile with respect to a pin 46a situated in a plane perpendicular to the main axis 5 of the frame 63. The mobile jaw 46 is returned to the closed position by a return spring 64. The end 47 of the magnetic element 45 constitutes a detection surface of the magnetic field that is substantially exposed through an outer reference surface 48 of the gripper body 45 that extends parallel to the transfer path of the object 2.

The transfer device comprises a control device 49 situated in the frame 63 and is constituted by an electromagnetic generator capable of generating a magnetic field in the operation zone 61 of the gripper through which the magnetic element 44 of the gripper passes during transfer of the object.

The fourth embodiment shown in FIGS. 8A and 8B differs from the second embodiment only by the fact that it comprises a control device 50 generating a magnetic field not on a horizontal plane but on a vertical field 51 of a frame 58.

A gripper 57a, 57b comprises the mobile jaw 28a having a protrusion extending along the vertical field 51 and having a single magnetic element 52, 56 capable of entering an operation zone 54 situated opposite the permanent magnet 50 controlling the gripper 57a, 57b.

In the variant shown in FIG. 8A, the mobile jaw 28a of the gripper 57a is linked to the gripper body 57a, 57b by a tensioned return spring 53. The magnetic element 52 is a permanent magnet arranged in repelling fashion with respect to the controlling permanent magnet 50. The operation of the gripper 57a takes place on the condition that the sum of the magnetic intensities (a) and (c) generated by the two permanent magnets 50, 52 is greater than the return force (d) under tension generated by the tensioned return spring 53. In other words, the gripper 57a operates if (a)+(c)>(d).

In the variant shown in FIG. 8B, the return means of the gripper 57b is a compressed spring 55 and the single magnetic element 56 of the gripper 57b is made of soft iron. When the gripper 57b reaches the operation zone 54, the magnetic attraction force (a) generated by the controlling permanent magnet 50 on the magnetic element 56 is greater than the compressive force (d) on the spring (55).

Generally, the fact that the grippers 6, 22, 22a, 57b, 62 intended to grasp the objet 2 to be transferred are equipped with a magnetic element having a detection surface exposed through a reference surface of the gripper makes it possible for a fixed frame 3, 20, 58 to generate a magnetic field along a transfer path of an object so as to directly control the gripper, making it pass from an open configuration to a closed configuration or vice-versa. Advantageously, the object transfer path is substantially parallel to the detection surface of the gripper.

The invention claimed is:

1. Object transfer device comprising:
a frame,
a gripper including a gripper body,
a guiding member adapted to guide the gripper body with respect to the frame;
the gripper including:
one or more jaws mounted on the gripper body and being movable with respect to the gripper body between a first configuration and a second configuration of the gripper, one of said first or second configurations corresponding to the opening of the gripper and the other of said first or second configurations of the gripper corresponding to a clamping of the gripper onto the object to be transferred,
an operating device adapted to operate the gripper from the first configuration to the second configuration of the gripper, and
a permanent return device permanently adapted to bring the gripper from the second configuration of the gripper to the first configuration of the gripper;
wherein the operating device comprises a magnetic element and is capable of overcoming the action of the return device only when the magnetic element is subjected to a magnetic field greater than an efficiency threshold, and
wherein the frame comprises a control device of the gripper capable of creating a magnetic field greater than the efficiency threshold in at least one zone of the frame dedicated to the operation of the gripper; said guiding member being designed so that the magnetic element of the gripper is driven along a movement path passing through the operation zone of the gripper defined by the control device.

2. Device according to claim 1, in which said guiding member is designed so that the movement path of the magnetic element leaves said at least one operation zone so that the magnetic field experienced by the magnetic element becomes smaller than said efficiency threshold.

3. Device according to claim 1, of the transfer wheel type, in which the guiding member comprises a support on which the gripper is attached, the support being mobile in rotation with respect to a main axis of the frame.

4. Device according to claim 3, in which said one or more jaws of the gripper are mounted at the end of a telescopic arm.

5. Device according to claim 4, in which said arm is hinged around a point of attachment to the support situated at a distance from the main axis of the frame.

6. Device according to claim 3, in which the magnetic element has a magnetic field detection surface extending in a plane perpendicular to the main axis of the frame.

7. Device according to claim 3, in which the magnetic element has a magnetic field detection surface extending in a plane parallel to the main axis of the frame and to the movement path of the magnetic element.

8. Device according to claim 1, in which the control device comprises a permanent magnet.

9. Device according to claim 1, in which the control device comprises an electromagnet.

10. Gripper for an object transfer device, comprising:
a a gripper body,
a mobile jaw mounted on the gripper body,
a permanent return device capable of moving the mobile jaw from a second configuration to a first configuration of the gripper, one of said configurations corresponding to the opening of the gripper and the other of said configurations corresponding to a clamping of the gripper onto the objet to be transferred,
an operating device that can be operated in order to bring the gripper from the first configuration of the gripper to the second configuration of the gripper,
wherein the operating device comprises a first magnetic element that is interdependent with the gripper body and a second magnetic element that is interdependent with the mobile jaw;
wherein the gripper has an air gap extending between the first and the second magnetic element at a distance from a detection surface of the first magnetic element, the air gap being dimensioned so that, when the detection surface is immersed in a magnetic field greater than an efficiency threshold, a force capable of overcoming the return device is applied to the mobile jaw.

11. Gripper according to claim 10, in which the first magnetic element has two end portions connected by an elbow shape, the end of one of the portions being the magnetic field detection surface, the end of the other portion defining the air gap.

12. Gripper according to claim 10, extending in a volume delimited globally by an outer surface of the gripper, the detection surface of the first magnetic element substantially exposed through the outer surface of the gripper so as to be capable of forming a magnetic interface with a magnetic control device external to the gripper.

13. Gripper according to claim 10, in which the mobile jaw is mounted in rotation around a rotation axis of the mobile jaw; the air gap extending at a distance from the rotation axis, in a plane parallel to the rotation axis.

14. Gripper according to claim 10, in which the first magnetic element is constituted by soft iron and the second magnetic element is constituted by soft iron.

15. Gripper according to claim 10, in which the first magnetic element is constituted by soft iron and the second magnetic element is constituted by a permanent magnet.

16. Gripper according to claim 10, in which the permanent return device comprises at least one permanent magnet.

17. Gripper according to claim 10, comprising a second mobile jaw and a synchronizing device adapted to synchronize the movement of the two jaws with respect to the gripper body.

* * * * *